July 19, 1960  K. A. KLINGLER  2,945,689
EXTERNAL SEAL SHOCK ABSORBER
Filed March 15, 1957  2 Sheets-Sheet 1

Inventor
Karl A. Klingler
by Parker & Carter
Attorneys

July 19, 1960 K. A. KLINGLER 2,945,689
EXTERNAL SEAL SHOCK ABSORBER
Filed March 15, 1957 2 Sheets-Sheet 2
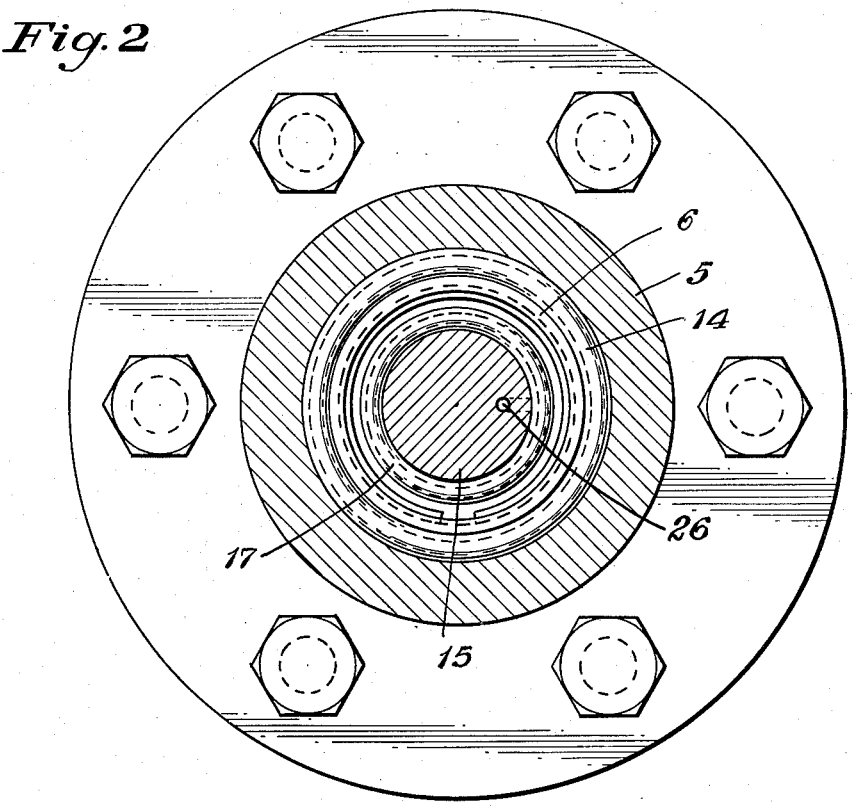
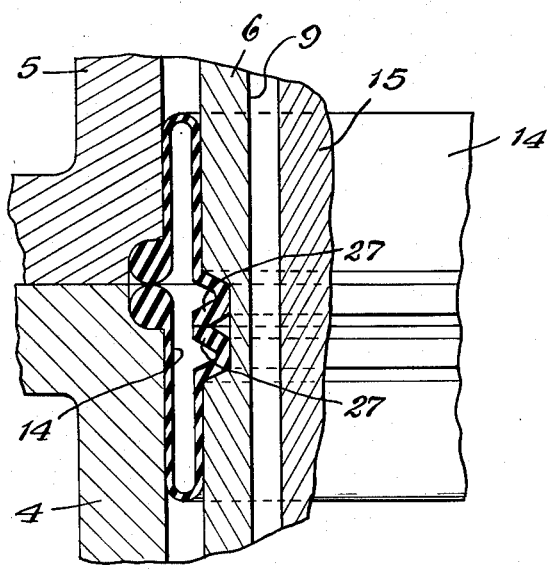
Inventor
Karl A. Klingler
by Parker & Carter
Attorneys

United States Patent Office 2,945,689
Patented July 19, 1960

2,945,689
EXTERNAL SEAL SHOCK ABSORBER

Karl A. Klinger, 111 S. Wright, Naperville, Ill.

Filed Mar. 15, 1957, Ser. No. 646,462

5 Claims. (Cl. 267—34)

My invention relates to improvements in shock absorbers and has for one object to provide a device wherein the resilience of a spring, the resistance to flow of oil through controlled variable apertures and the resistance to compression of air operate in unison to yieldingly resist and finally to stop movement.

Another object of the invention is to so separate the air and the oil and the different pressure chambers containing them that no leakage may occur.

Another object of the invention is to provide packing means to vary the effective cross sectional area of passages through which the oil may flow while completely preventing leakage which by passes the passage.

Other objects will appear from time to time throughout the specification and claims.

My invention is illustrated more or less diagrammatically in the accompanying drawings, wherein Figure 1 is a longitudinal section through a shock absorber;

Figure 2 is a section along the line 2—2 of Figure 1;

Figure 3 is a section on an enlarged scale similar to the plane of Figure 1 showing the packing means.

Like parts are indicated by like characters throughout the specification and drawings.

Figure 1:
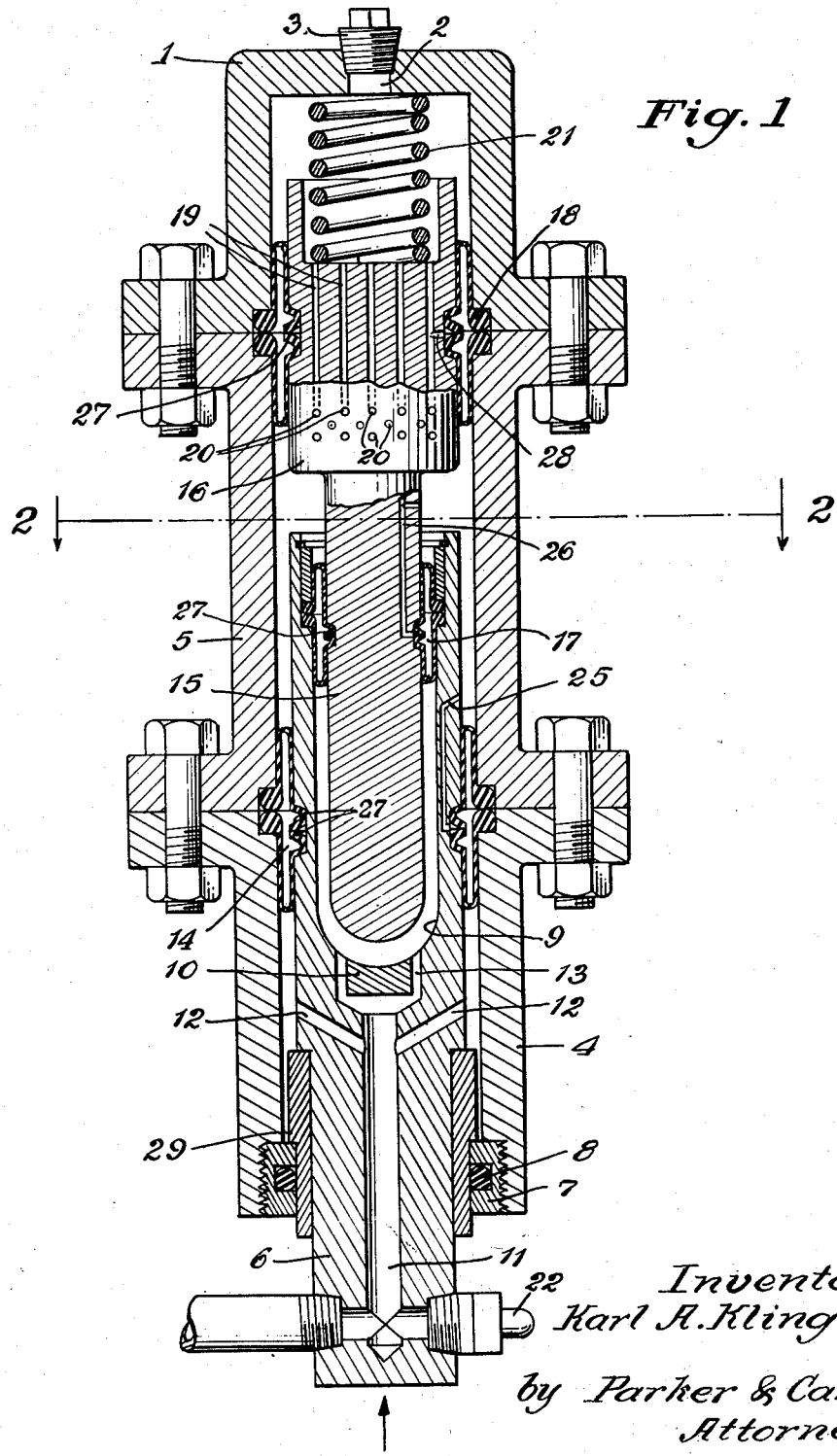

Three cylindrical parts flanged and bolted together form the shock absorber body. The closed cap cylinder 1 ported at 2 has the filler plug 3. The end cylinder 4 is open to atmosphere and the intermediate cylinder 5 completes the assembly. The interior diameter of the three cylinders is uniform. Contained within the cylinder is a two part shock absorber plunger. 6 is the female or air plunger. It is guided in cylinder 4 by bearing sleeve 7, associated with an O-packing ring 8 where it projects beyond the end of the cylinder 4. Plunger 6 is recessed at its inboard end as at 9, the impact member 10 is located at the bottom of the recess. An air duct 11 extends longitudinally of the plunger 6. Radial ducts 12 extend therefrom through the wall of the plunger 6. The duct 11 communicates through ducts 13 to the recess 9. 14 is a packing bag anchored on the outer periphery of the plunger 6 and the inner periphery of the cylinders 4, 5 and extending longitudinally in both directions from the anchorage in an annular space between the plunger and cylinder.

The male or oil plunger 15 extending into the recess 9 carries at its outer end the oil piston 16. A packing bag 17 similar except for size to the bag 14 is interposed between the male member 15 and the plunger 6 and a similar packing bag 18 is anchored and interposed between the piston 16 and the cylinders 1 and 5.

A multiplicity of ducts 19 open at the upper end of the piston 16 and terminating each in a separate port 20 are spaced around the periphery of the piston 16 and also spaced longitudinally therealong so that as the piston moves upwardly from the position shown in Figure 1, successive ports will be closed by the packing bag 18.

The flange extending upwardly from the piston 16 guides the compression spring 21 which may be compressed between the upper end of the piston 16 and the closed end of the cap cylinder 1 and can, if necessary, positively limit the upper excursion of the piston.

Assuming the parts in the position shown in Figure 1, the filler cap 3 being removed, oil or shock absorbing hydraulic fluid may be inserted into the cylinder to fill the area above the packing bags 14 and 17. Air will then be forced under pressure through the check valve 22 into the area below the packing bags 14 and 17 to force the plunger 15 upwardly out of contact with the impact member 10 and initially compress the spring 21. The filler plug 2 is then put in place and the shock absorber is ready for operation with oil above and below the piston and with air under pressure separating the male plunger from the female plunger. I have not illustrated, because they form no part of the present invention, the particular means for connecting the cylinder to one moving part and the plunger 6 to another, as they will vary depending upon the particular use to which the shock absorber is put.

Assuming that pressure is applied in the direction of the arrow to the air in the area below the packing bags 14 and 17, will be compressed as the plunger 6 is forced inwardly until the stem 15 bottoms on the impact member 10. This movement also applies pressure to the oil above packing bags 14 and 17 and forces the hydraulic fluid to flow upwardly through the ducts 19 to balance the pressure above and below the piston 16. This causes the plunger 15 to come down to meet the plunger 6 and opens the upper layer of ports. Then as pressure increases, plungers 6 and 15 move upwardly as a unit compressing the spring 21, causing oil to pass in a reverse direction through the ducts 19 from above to below the piston. As the piston moves up more and more of the ports 20 will be sealed by the packing bag and more and more resistance to oil flow results from decrease in area available for oil passage until at the end of the excursion all the ports 20 are closed and movement is positively stopped by the incompressible hydraulic fluid. When the pressure is released the parts will return to the starting position shown in Figure 1 under the expanding force of spring 21 and the air below packing bags 14 and 17.

Ducts 25 in plunger 6 and 26 in plunger 15 connect the interiors of the bags 14 and 17 with the oil pressure area in contact with the outer peripheries of the male plunger 15 and the female plunger 6 so that fluid pressure therein will pass inwardly through the lips 27 to fill the extensible flexible bags to maintain the packing seal. The same principle applies to the duct 28 between one of the passages 19 and the interior of the packing bag 18. It will be understood, of course, that other means for filling these bags could be provided. The bags might be filled before assembly and perhaps in actual assembly they will be at least partially filled and the pressure will be relied upon to complete filling them as they must be substantially filled in order to effect a seal.

Since there is an initial pressure in the shock absorber, limiting means must be provided to limit the outward movement of the plunger 6. This may take the form of a shoulder on the sleeve 29 as indicated abutting against the ring 7 which if desired, may be threaded into the cylinder 4. It will be understood that it is the O-ring 8 that is relied upon to prevent leakage of air from between the cylinder 4 and plunger 6 and that the bearing sleeve 7 does not interfere in any way with the reciprocatory movement of the plunger 6, being merely a guide and maintaining a working fit.

One of the elements of my invention is the metering valve defined by the apertured plunger 16 and the flexible sack 18 whereby as the sack being anchored to the wall of the plunger at a point spaced from the port is caused to roll back and forth along the ported surface so that the forward edge of the relatively thin sack may mask and unmask the ports and so increase or decrease the effective port area.

The space between the male and female plunger and the spaces between the female plunger and the cylinder, together with the ducts joining them define in effect a single pneumatic chamber which may contain air under the same pressure throughout. The space outside of the female plunger between it and the cylinder and the lower portion of the male plunger defines a separate hydraulic chamber. The male plunger together with the cylinder defines with the packing a second hydraulic chamber.

The air in the pneumatic chamber starting at initial pressure may be further compressed but will not escape from the pneumatic chamber. The fluid in the two hydraulic chambers flows back and forth between the two chambers being controlled by the packing and metering valve bag but since the hydraulic fluid is incompressible, upward movement of the female plunger must be compensated for by penetration of the male into the female member so that a portion of the male member penetrates the air chamber, being withdrawn from the hydraulic chamber as the female member penetrates the hydraulic chamber.

The use and operation of my invention are as follows:

An essential element in my invention is the presence of a positive, substantially frictionless packing means between the moving parts of my shock absorber, taking the form of a flexible walled impervious annular bag-like member enclosed in the annular space between a plunger and a cylinder, held intermediate its ends on one side in fixed contact with the cylinder and on the other in fixed contact with the plunger, extending longitudinally in both directions from such points of attachment and completely filled with a hydraulic fluid which holds the opposed walls of the bag respectively against the surface of the plunger and cylinder and offers negligible frictional resistance. The packing bag 18 and the ports 20 are so related that as the piston 16 moves longitudinally, the bag rolls onto or off the outer periphery of the piston, thus opening and closing some or all of the ports in an amount depending on the extent of movement. Because the bag walls roll from one of the opposed surfaces to the other, movement of the piston causes the forward boundary of the bag to move in the same direction at half the speed so a quarter of an inch movement of the piston will give one-eighth inch change in the position of the metering edge of the bag, thus automatically stepping up the accuracy of the metering effect.

I claim:

1. In a shock absorber, a cylindrical housing, aligned plungers normally out of contact with one another therein, packing means defining with said plungers and cylinder, an air compression chamber, the pressure in the chamber biasing the plungers apart, said packing means defining with the plungers and the cylinder an oil chamber separate from the air chamber, a piston in the oil chamber actuated by one of the plungers for displacing hydraulic fluid and means automatically responsive to the movement of the fluid displacing means for varying the resistance to fluid flow, said means comprising metering ports in the piston and rolling packing means between the piston and the cylinder wall adapted to open and close said ports in consonance with plunger movement, a spring biasing the plungers toward each other against the air pressure.

2. In a shock absorber, a cylinder, an oil piston and an air piston mounted for separate longitudinal movement therein, a plunger rigidly connected to the oil piston penetrating the air piston, backing means between the plunger and the air piston, packing means between the air piston and the cylinder and packing means between the oil piston and the cylinder whereby the interior of the cylinder is divided up into an air chamber and oil chambers on opposite sides of the oil piston, means for maintaining air pressure in and about a portion of the air cylinder to bias the air piston and the oil piston apart, ported oil ducts extending through the side wall of the oil piston, the packing means and the ports for the oil ducts being so disposed that as the piston is moved inwardly responsive to pressure on the plunger, the ducts are progressively closed by the packing means, a spring biasing the air piston and the oil piston toward each other against the air pressure.

3. A metering valve including a hollow cylinder, a plunger mounted for longitudinal movement therein, a rolling packing bag encircling the plunger, anchored on opposed sides on the opposed surfaces of plunger and cylinder and extending in opposite directions from the anchorage along the annular space between the plunger and cylinder, ports in the wall of the plunger on one side of the packing communicating through the plunger with the space on the opposite side of the packing, the packing and ports being so positioned that as the plunger moves longitudinally an end of the packing bag rolls off the wall of the cylinder into contact with the wall of the plunger and vice versa depending upon the direction of relative movement to open and close the ports.

4. A shock absorber including a cylinder open at one end, an air piston and an oil piston mounted to reciprocate therein, a compression spring between the oil piston and the closed cylinder end, the air piston extending through the open cylinder end and having a pocket open toward the oil piston, a plunger carried by the oil piston penetrating the pocket, packing means between the oil piston and the cylinder, between the air piston and the cylinder, between the plunger and the air piston and a second seal between the air piston and the cylinder adjacent the open end of the cylinder, the annular clearances between each piston and the cylinder, between the air piston and the plunger and the packing means defining respectively a two-part oil chamber above and below the oil piston, and a two-part air chamber encircling the air piston and between it and the plunger, there being an open connection between the two parts of the air chamber and a metering connection between the two parts of the oil chamber, the air chamber containing air under pressure to balance the pressure of the spring.

5. A shock absorber including a cylinder open at one end, an air piston and an oil piston mounted to reciprocate therein, a compression spring between the oil piston and the closed cylinder end, the air piston extending through the open cylinder end and having a pocket open toward the oil piston, a plunger carried by the oil piston penetrating the pocket, packing means between the oil piston and the cylinder, between the air piston and the cylinder, between the plunger and the air piston and a second seal between the air piston and the cylinder adjacent the open end of the cylinder, the annular clearances between each piston and the cylinder, between the air piston and the plunger and the packing means defining respectively a two-part oil chamber above and below the oil piston, and a two-part air chamber encircling the air piston and between it and the plunger, there being an open connection between the two parts of the air chamber and a metering connection between the two parts of the oil chamber, the air chamber containing air under pressure to balance the pressure of the spring, the metering connection including a duct extending through the oil piston having a port in the side wall thereof, the packing means between the oil piston and the cylinder including an annular bag anchored intermediate its ends respectively to the oil piston and cylinder walls, closing the annular space between them, the ends of the bag being free to roll as the piston reciprocates into and out of metering register with the port.

References Cited in the file of this patent

UNITED STATES PATENTS

| | | |
|---|---|---|
| 1,819,414 | Gruss | Aug. 18, 1931 |
| 2,115,383 | Christensen | Apr. 26, 1938 |
| 2,688,150 | Roussel | Sept. 7, 1954 |
| 2,720,378 | Otto | Oct. 11, 1955 |
| 2,781,051 | Hawley | Feb. 12, 1957 |

FOREIGN PATENTS

| | | |
|---|---|---|
| 852,704 | France | Nov. 9, 1939 |
| 897,639 | Germany | Nov. 23, 1953 |